(12) United States Patent
Fletcher

(10) Patent No.: US 7,334,021 B1
(45) Date of Patent: Feb. 19, 2008

(54) PERSONALIZED AWAY MESSAGES

(75) Inventor: George Fletcher, Round Hill, VA (US)

(73) Assignee: AOL LLC, Dulles, VA (US)

( * ) Notice: Subject to any disclaimer, the term of this patent is extended or adjusted under 35 U.S.C. 154(b) by 927 days.

(21) Appl. No.: 10/425,709

(22) Filed: Apr. 30, 2003

(51) Int. Cl.
*G06F 15/16* (2006.01)
(52) U.S. Cl. ...................................... 709/206
(58) Field of Classification Search ................. 709/206
See application file for complete search history.

(56) References Cited

U.S. PATENT DOCUMENTS

| | | | |
|---|---|---|---|
| 6,640,230 B1 | 10/2003 | Alexander et al. | |
| 6,988,128 B1 | 1/2006 | Alexander et al. | |
| 7,035,865 B2 | 4/2006 | Doss et al. | |
| 2004/0145608 A1* | 7/2004 | Fay et al. | 345/758 |
| 2005/0004984 A1* | 1/2005 | Simpson | 709/205 |

OTHER PUBLICATIONS http://web.mit.edu/olh/Zephyr, "Zephyr on Athena (AC-34) Draft Table of Contents," Nov. 18, 2002, 25 pages.
http://www.stanford.edu/~kmitev/zephyr.html, "UNIX: Using Zephyr on Glue and WAM," Nov. 18, 2002, 8 pages.
http://office.microsoft.com/assistance/2002/articles/Olrwautoreply2.aspx, "Have Microsoft Exchange Server Send Custom Reply Messages with Outlook 2002," Mar. 11, 2003, 1 page.
http://www.fnal.gov/docs/products/zephyr.html, "zephyr—Zephyr Notification Service," Nov. 18, 2002, 2 pages.
Office Action from co-pending U.S. Appl. No. 10/743,016 dated Aug. 13, 2007, 17 pages.

* cited by examiner

*Primary Examiner*—Jason Cardone
*Assistant Examiner*—Chirag R Patel
(74) *Attorney, Agent, or Firm*—Fish & Richardson P.C.

(57) ABSTRACT

In general, an interface is provided to the user of an instant messaging client program. The interface displays the user's buddies in a manner that identifies one or more buddy groups, and the membership of buddies within one or more of those buddy groups. The user may use the interface to set customized away messages on a buddy group basis, or otherwise.

13 Claims, 14 Drawing Sheets

PERSONALIZED AWAY MESSAGES

TECHNICAL FIELD

This description relates to away messages used in instant messaging.

BACKGROUND

With the advent of the Internet and a decline in computer prices, many people are communicating with one another through computers interconnected by networks. A number of different communications programs have been developed to facilitate such communications between computer users. One type of communication program is the instant messaging (IM) client program. IM client programs typically have a user interface that presents representations of a user's selected buddies (i.e., other users of the instant messaging program selected by the user). When a buddy's IM client program is connected to the network and the buddy is available, a user may communicate or interact with the buddy (and other users) using the instant messaging program. For example, the user may use the IM client program to engage in a real-time textual messaging session with the buddy.

At times, a user may be away from his or her computer or otherwise unavailable to engage in communications with a buddy, even though his or her IM client program is connected to the network or otherwise available for communications. In such a situation, a user typically is considered to be "away." Some IM client programs allow users to configure a preset and global "away message" that is sent as a textual message to any buddy that attempts to message the user while the user's IM client program is configured in an away mode.

SUMMARY

Customized away messages may be provided to buddies of an instant messaging program user who try to communicate with the user through the instant messaging program while the user is away. An interface displays representations of the user's buddies in a manner that identifies one or more buddy groups and the membership of buddies within one or more of those buddy groups. The user may use the interface to select a buddy group and set a group away message for the selected buddy group. The set group away message is sent to buddies grouped into the selected buddy group that attempt to communicate with the user through the instant messaging program when the user is away.

The interface may be included as a part of an instant messaging program. The interface may include first and second interface elements that enable the user to set customized away messages on at least a per-buddy group basis. The first interface element displays representations of the buddies in a manner that identifies one or more buddy groups and the membership of buddies within one or more of those buddy groups and the second interface element allows the user to enter a message.

Implementations may include one or more of the following features. The interface may allow the user to additionally select a buddy and set a personal away message for the selected buddy. The personal away message then is sent to the selected buddy when the selected buddy attempts to communicate with the user through the instant messaging program when the user is away. Setting a personal away message may include appending an additional message on to the group away message or replacing the group away message with a new message.

The interface also may allow the user to set a global away message. Setting a group away message may include appending an additional message on to the global away message or replacing the global away message with a new message.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

In general, an interface is provided to the user of an instant messaging client program. The interface displays the user's buddies in a manner that identifies one or more buddy groups, and the membership of buddies within one or more of those buddy groups. The user may use the interface to set customized away messages on a buddy group basis, or otherwise.

Figure 1:
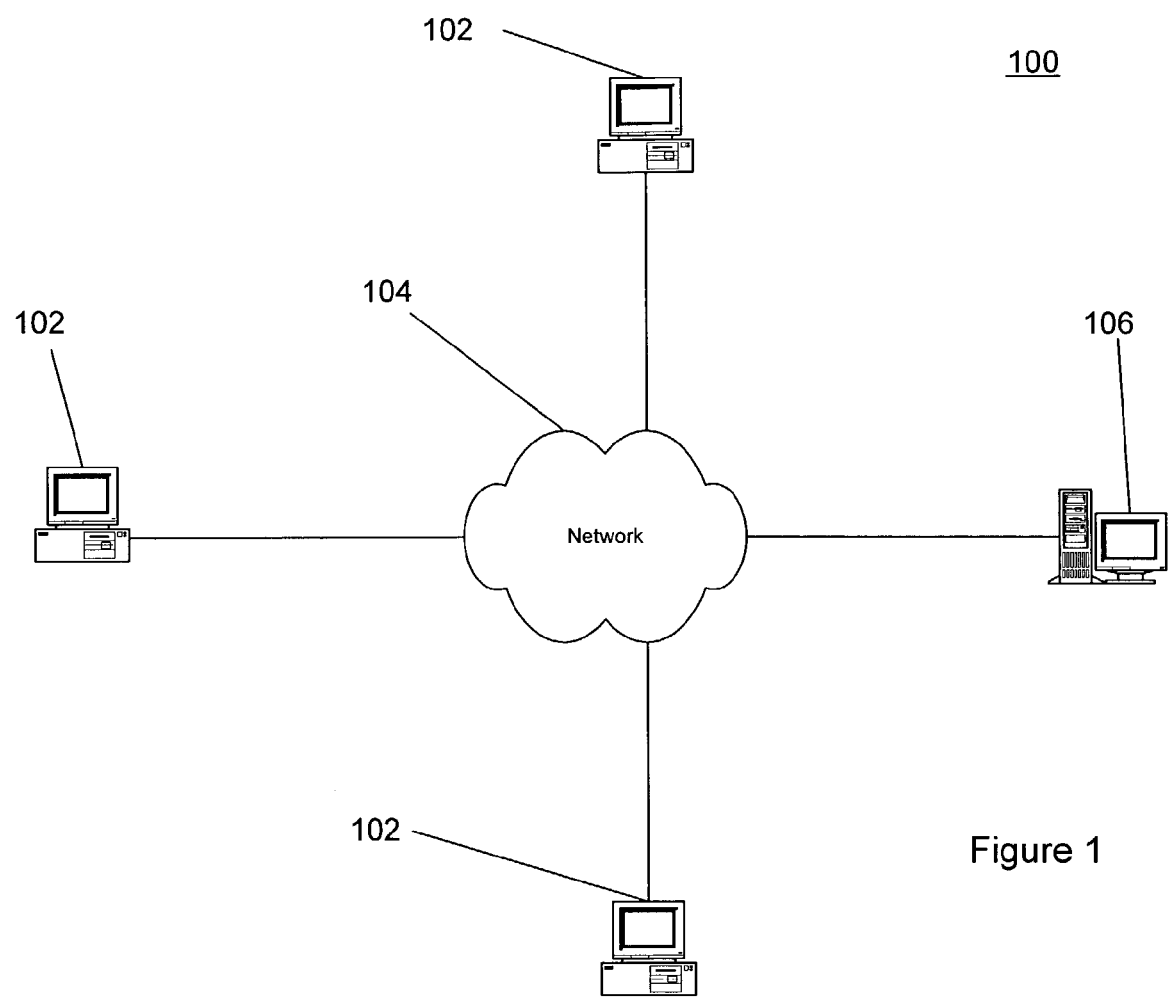
FIG. 1 is a diagram of an exemplary networked computing environment that may support instant messaging communications.

FIG. 1 illustrates an exemplary networked computing environment 100 that may support instant messaging communications. Computer users are distributed geographically and communicate using client systems 102. A network 104 interconnects client systems 102. Client systems 102 are connected to network 104 through various communication mediums, such as a modem connected to a telephone line (using, for example, serial line internet protocol (SLIP) or point-to-point protocol (PPP)) or a direct Internet connection (using, for example, transmission control protocol/internet protocol (TCP/IP)). A host server 106 also may be connected to network 104 and may be used to facilitate some direct or indirect communications between the client systems 102.

Each of the client systems 102 and host server 106 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 102 and host server 106 may receive instructions from, for example, a software application, a program, a piece of code, a device, a computer, a computer system, or a combination thereof, which independently or collectively direct operations. These instructions may take the form of one or more communications programs that facilitate communications between the users of client systems 102. Such communications programs may include, for example, electronic mail (e-mail) programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 102 or the host server 106.

Each client system 102 and host server 106 includes a communications interface (not shown) used by the communications programs to send communications through network 104. The communications may include e-mail, audio data, video data, general binary data, or text data (e.g., data encoded in American Standard Code for Information Interchange (ASCII) format).

Examples of the network 104 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network. The network 104 may include multiple networks or sub-networks, each of which may include, for example, a wired or wireless data pathway.

Instant messaging client programs (executing on clients 102, for example) may use an instant messaging server to assist in communications between users. The instant messaging server may be implemented, for example, using host server 106. When a user is connected to the network 104 and executes the instant messaging client program, the instant messaging client program contacts the host server 106 and logs the user onto the host server 106. The host server 106 may inform the instant messaging client program when the program user's buddies are online and may facilitate communications between the program user and a buddy. Thus, once logged on to the host server 106, a user may use the IM client program to view whether particular buddies are online, to exchange IMs with particular buddies, to participate in group chat rooms, or to trade files such as pictures, invitations or documents. The program user also may be able to find other buddies with similar interests, get customized information such as news and stock quotes, and search the World Wide Web.

The host server 106 may support IM services irrespective of a program user's network or Internet access. Thus, host server 106 may allow users to send and receive IMs, regardless of whether they have access to any particular Internet service provider (ISP). The host server 106 also may support associated services, such as administrative matters, advertising, directory services, chat, and interest groups related to IM. To transfer data, the host server 106 employs one or more standard or proprietary IM protocols.

Host server 106 may assist IM communications between users of IM client programs by facilitating the establishment of a peer-to-peer communication session between the IM client programs. Or the host server 106 may assist IM communications by directly routing communications between the IM client programs.

Figure 2A:
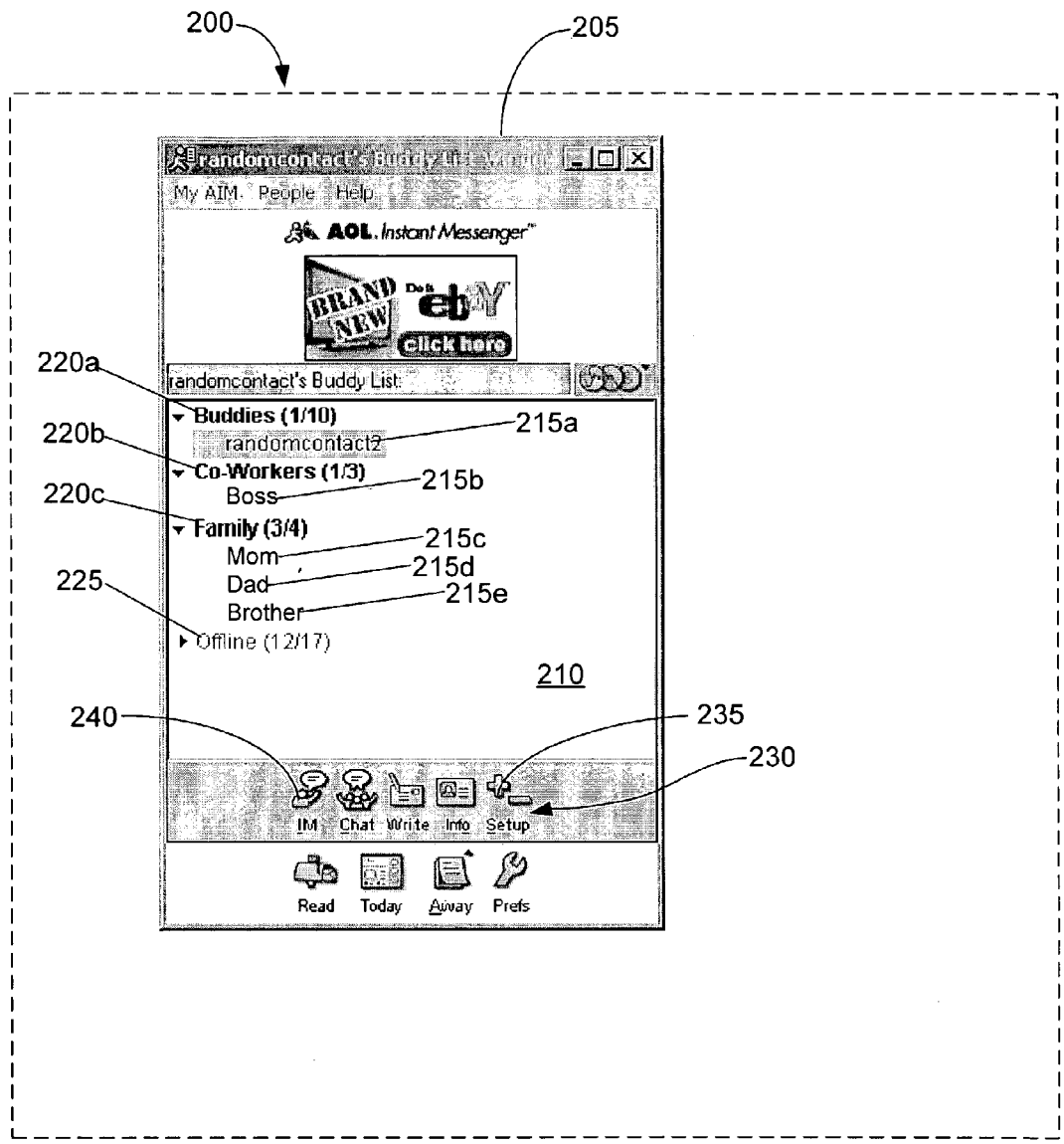
FIG. 2A is an illustration showing an exemplary interface presented to a user when an instant messaging client program is running on one of the client systems of FIG. 1.

FIG. 2A illustrates an exemplary interface presented to a user (e.g., randomcontact) when an instant messaging client program is running on one of the client systems 102. Instant messaging programs typically allow users to communicate in real-time with each other in a variety of ways. For example, many instant messaging programs allow users to send text as an instant message, to transfer files, and to communicate by voice. Examples of IM programs include AIM (America Online Instant Messenger), AOL (America Online) Instant Messaging, Yahoo Messenger, MSN Messenger, and ICQ.

Shown is a desktop 200 with a user interface 205 of the instant messaging client program. User interface 205 has a box 210 that displays representations 215a-215e of the program user's buddies. In the interface 205, the representations 215a-215e are icons showing the screennames of the buddies, however, other types or forms of representations may be used. The representations 215a-215e may provide contextual information to the program user about the buddy, such as whether the buddy is online, how long the buddy has been online, whether the buddy is away, or whether the buddy is using a mobile device.

The list of buddies displayed in box 210 of user interface 205 typically is referred to as the buddy list. In the buddy list, buddies are grouped together into buddy groups. The name or representation of each buddy group is displayed in the buddy list. When a buddy's IM client program is able to receive communications, the representation of the buddy in the buddy list is displayed or visually modified under the name or representation of the buddy group that includes the buddy. For example, in the interface shown by FIG. 2A, the buddy whose screenname is "randomcontact2" is part of the Buddies buddy group and, consequently, the representation 215a for randomcontact2 is listed under the representation 220a for the Buddies buddy group. Likewise, the buddy whose screenname is "Boss" is part of the Co-Workers buddy group and, consequently, the representation 215b for Boss is listed under the representation 220b for the Co-Workers buddy group. Similarly, the buddies whose screennames are "Mom," "Dad," and "Brother" are part of the Family buddy group 220c and, consequently, their representations 215c-215e are listed under the representation 220c for the Family buddy group.

When a buddy is not online, the representation of the buddy is listed under the representation 225 for the Offline buddy group. When a buddy's IM client program is first able to receive communications, the representation of the buddy may be visually modified and moved from the Offline buddy group to the buddy group that includes the buddy. Similarly, when the buddy's IM client program first becomes unable to receive communications, the representation of the buddy may be visually modified and moved from the buddy group to the Offline buddy group.

Figure 2B:
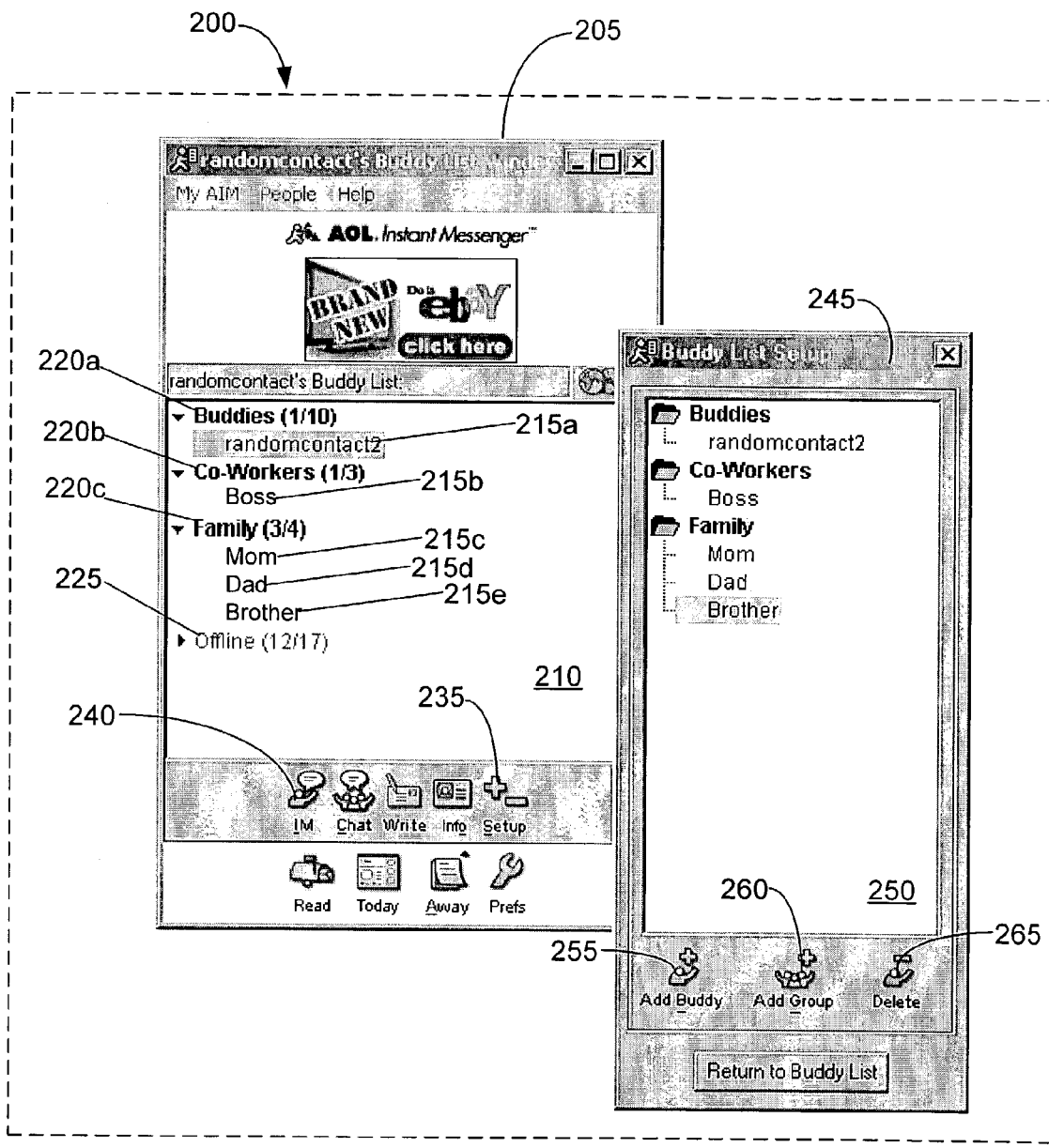
FIG. 2B is an illustration showing a window that may be used to configure a buddy list of an instant messaging client program.

Referring to FIG. 2B, the user may configure the buddy list by adding, deleting, or renaming buddy groups and by changing the relationship of one or more buddies with respect to a group (e.g., by adding buddies to or deleting buddies from each buddy group, or by making one group relate to another group). Shown in FIG. 2B is a window 245 that may be invoked for configuring the buddy list. Window 245 includes a list box 250, which contains a list of buddy groups and screennames that corresponds to the buddy list displayed in user interface 205, absent the offline buddy group. As the user makes changes to the list in the window 245, those changes are reflected in the buddy list displayed in interface 205.

To allow a user to make changes to the list in list box 250, window 245 includes an Add Buddy button 255, an Add Group button 260, and a Delete button 265. Other buttons or interfaces may be used for configuring the buddy list. To add a buddy group, the user selects the Add Group button 260 and enters the name of the new buddy group, which is added to list box 250. To add a buddy to a buddy group, the user selects the buddy group, selects the Add Buddy button 255, and enters the screenname or other identifier of the buddy. The buddy is then listed under the selected buddy group. For instance, to create the Family buddy group 220c, the user selected the Add Group button 260 in window 245 and entered "Family." This buddy group was then added to the list in list box 250 and, consequently, added to the buddy list displayed in interface 205. To add the group members (Mom, Dad, and Brother), the user selected the Family buddy group listed in list box 250, selected the Add Buddy button 255, and entered in the screenname of one the group members. This was repeated until all group members were added. To remove buddies or groups, the user selects the buddy or group and then selects the Delete button 265. A buddy may occupy more than one buddy group.

Referring again to FIG. 2A, user interface 205 may have icons 230 to help a user set various options or perform operations in the instant messaging program. By selecting the "setup" icon 235, for example, the program user can invoke window 245 for configuring the buddy list.

When a buddy is online, the program user may use the instant messaging client program to communicate or interact with the buddy in a number of ways. For instance, the program user can send an instant message to the buddy (typically in the form of text). To send instant messages, a program user initiates an instant message session with a buddy. A program user may initiate the instant message session, for example, by double-clicking on a buddy's representation 215 or by first selecting a buddy and then selecting an "IM" icon 240. Starting a session may invoke a window in which messages can be typed back-and-forth between the program user and the buddy.

Figure 2C:
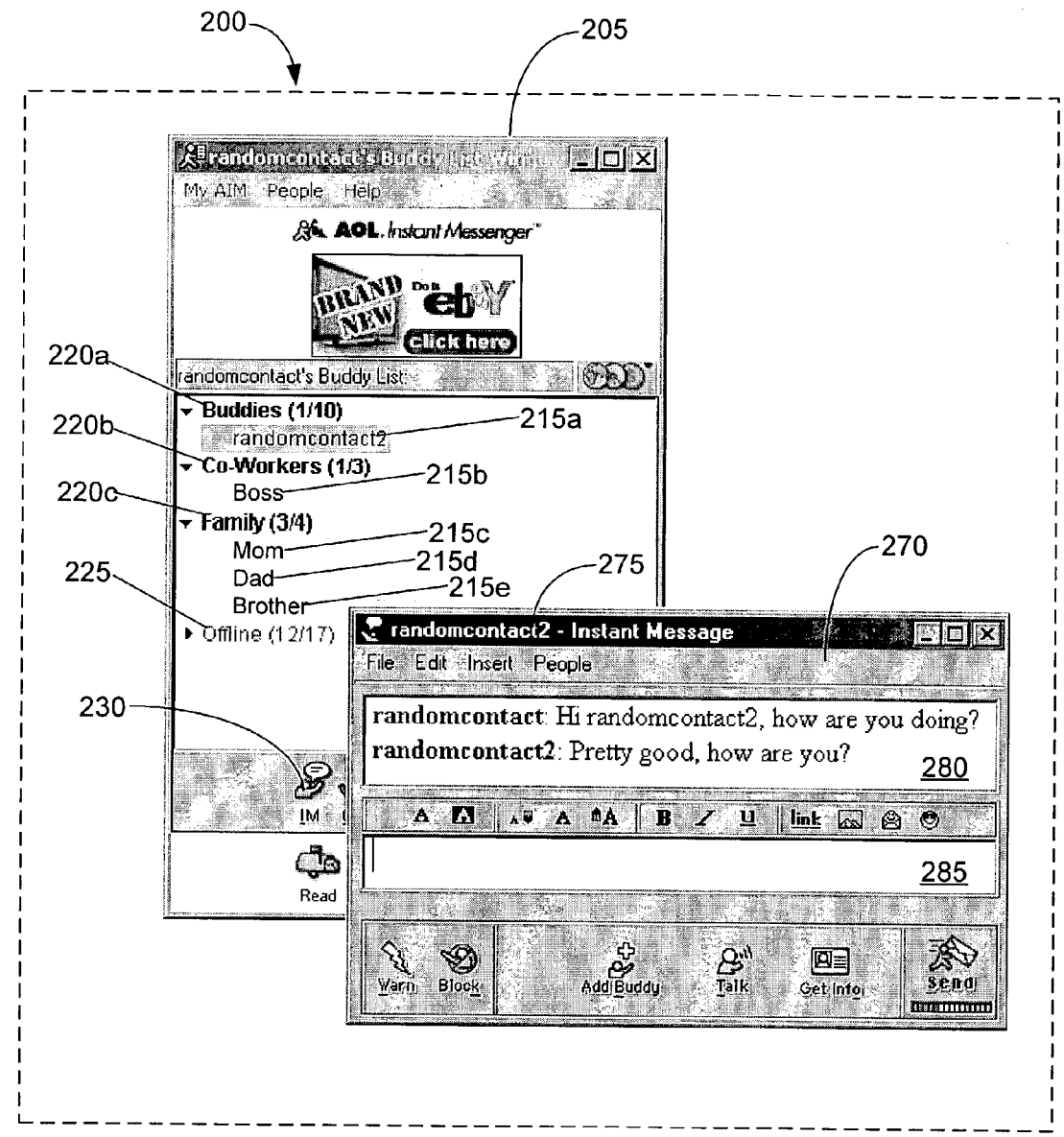
FIG. 2C is an illustration showing an exemplary instant messaging window presented when a user is engaged in a textual instant message session with a buddy.

FIG. 2C illustrates an exemplary instant messaging window 270 presented when a user is engaged in a textual instant message session with a buddy. The window 270 includes a titlebar 275, in which the buddy's screenname (e.g., "randomcontact2") is shown. Window 270 includes a text box 280 and an edit box 285. A similar window is displayed on the buddy's client system.

The sent and received messages of the user and buddy are displayed in text box 280. The sender's (i.e., user's or buddy's) screenname may be listed beside the sender's corresponding message in text box 280. For instance, in the exemplary window shown, the user (whose screen name is "randomcontact") has typed and sent the message "Hi randomcontact2, how are you doing?" to the buddy (whose screenname is "randomcontact2"). The buddy has replied with the message "Pretty good, how are you?". To send a message, the user types the message in edit box 285 and activates a send command, for example, by pressing an ENTER key. In response, the entered text is displayed in text box 280 and in the textbox of the similar window displayed on the buddy's client system.

As described above, a user may be away from his or her computer or otherwise unavailable to engage in communications with a buddy, even though his or her instant messaging program is connected to the network or otherwise available for communications. In such a situation, a user typically is considered to be "away." The instant messaging client program may be placed in an away mode, in which the user is considered away (i.e., unavailable to engage in communications with a buddy). When the instant messaging client program is in an away mode, the client program automatically sends an away message to a buddy that attempts to communicate with the user through the instant messaging client program. The away message that is sent may be set or input by the user.

The instant messaging client program may be explicitly placed into an away mode by the user. For example, the instant messaging client program may have an "Away" menu item that the user can select to place the instant messaging client program into an away mode. The instant messaging program also may enter an away mode automatically in response to various factors. For example, the instant messaging client program may enter an away mode automatically when there has not been any input to the client system for a predetermined period of time.

Further, a user also may be considered "away" when the instant messaging client program is not logged onto host server 106 and away messaging may be handled, for example, by host server 106. In this case, an away mode is entered (by host server 106) when the instant messaging client program logs off of host server 106.

In general, host server 106 may be used to handle away messaging, rather than the instant messaging client program. That is, the instant messaging client program acts as the interface for the user to set up away messaging, but away messages are sent to buddies by host server 106, rather than by the instant messaging client program.

Figure 3:
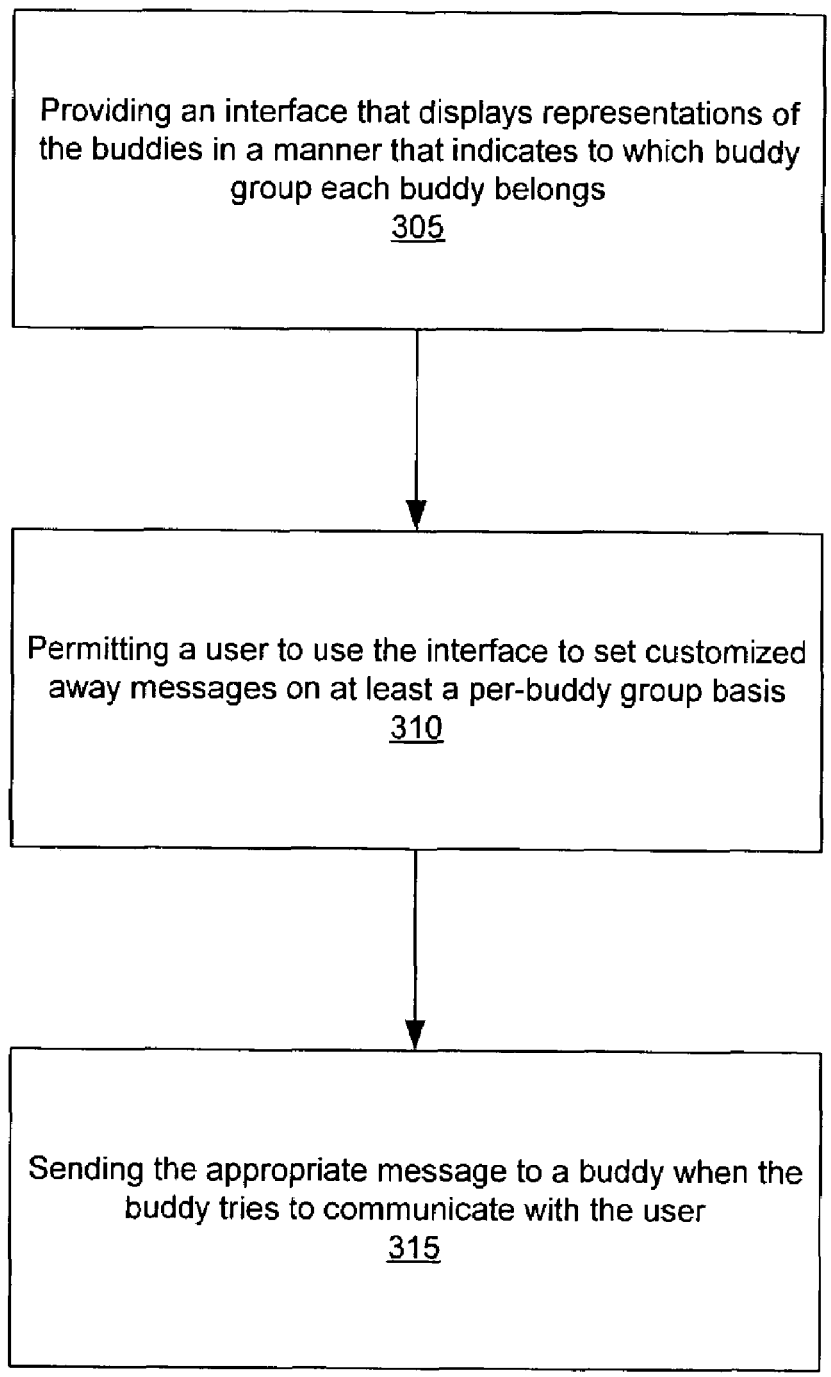
FIG. 3 is a flow chart illustrating a method for providing customized away messages to buddies that attempt to communicate with the user through an instant messaging client program while the user is away.

FIG. 3 is a flow chart illustrating a method 300 for providing customized away messages to buddies that attempt to communicate with the user through the instant messaging client program while the user is away. An interface is provided to the user (305). The interface displays representations of the user's buddies in a manner that identifies one or more buddy groups, and the membership of buddies within one or more of those buddy groups. For example, the interface may display the buddies in the same manner as interface 205, with the screennames of the buddies displayed underneath the name of the buddy groups that include the buddies. Other ways of displaying the buddies that identifies one or more buddy groups, and the membership of buddies within one or more of those buddy groups may be used. The interface may be a graphical user interface (GUI) and may be composed of one or more windows in a windowing-based graphical environment (e.g., Microsoft Windows, Macintosh, X Windows).

The user may use the interface provided to set customized away messages on a buddy group basis (310). To set a customized away message for a buddy-group, the user may use the interface to select the buddy group and enter in an away message that will be used for all buddies that belong to the selected buddy group. In other implementations, in addition to setting away messages on a group basis, the user may be able to use the interface to set a global away message and/or personal away messages on a per-buddy basis. A global away message is a default away message sent to a buddy if no other type of away message (e.g., buddy group away message or personal away message) is set for the buddy. A personal away message is a message that is set for a particular buddy and only used for that buddy.

In some implementations that allow for global away messages, the group away messages set for a buddy group may be set by overriding the global away message with a new message or by appending an additional message to the global away message. For example, if the global away message is set to "I am away.", then a buddy group message may be set by appending "I will be back in an hour." to the global away message. In this case, the away message set for buddies in the selected buddy group would be "I am away. I will be back in an hour." If the buddy group message was set by replacing the global away message, the away message set for buddies in the selected buddy group would be "I will be back in an hour." Similarly, in some implementations that allow for personal away messages, the personal away messages may be set by appending a new message to the group away message (or global away message, if implemented, and no group away message exists) or by overriding a group away message or a global away message for particular buddies.

Appending may be implemented by concatenating each new message to the higher level message and storing the resulting message as the personal or group away message. Following the example above, in this case the message "I will be back in an hour." is concatenated to the message "I am away." when the user chooses to append. The resulting message then is stored as the group away message, which is sent to buddies in the group while the user is away.

Alternatively, appending may be implemented by storing each message separately and concatenating each of the messages just prior to sending the away message to a buddy. Following the example above, in this case the message "I am away." is stored as the global away message and the message "I will be back in an hour." is stored separately as the group away message, along with an indicator that the group away message is to be appended to the global away message. The group away message is concatenated to the global away message just prior to sending the away message to a buddy in the buddy group. The message resulting from the concatenation then is sent to the buddy.

Default global away messages, default group away messages, or default personal away messages, may be provided, depending on the implementation. For example, if the Buddies buddy group is provided as a default upon installation of the instant messaging client program, a default group away message also may be provided for the Buddies buddy group. As another example, a default global message may be provided when the instant messaging client program is installed so that an away message always exists for the buddies, regardless of whether a user has personalized any away messages, group or personal. Similarly, a default group message may be provided for any default buddy groups and newly created buddy groups, whether or not a global message is provided. This enables an away message to always exist for buddies even when no global away message exists, regardless of whether a user has set a group away message (or personal away message, if implemented also).

When a buddy tries to communicate with the intended recipient user through the instant messaging client program while the user is away or offline, the appropriate away message is sent (315). For example, in an implementation which supports global away messages, group away messages, and personal away messages, a personal away message is sent to the buddy if, set; otherwise, or additionally, a group away message is sent, if set; otherwise, or additionally, a global away message is sent, if set. As another example, in an implementation that supports global away messages and group away messages, the group away message for the group that includes the buddy is sent, if set; otherwise, or additionally, the global away message is sent, if set. In an implementation that only supports group away messages, the group away message for the group that includes the buddy is sent to the buddy, if set.

Figure 4A:
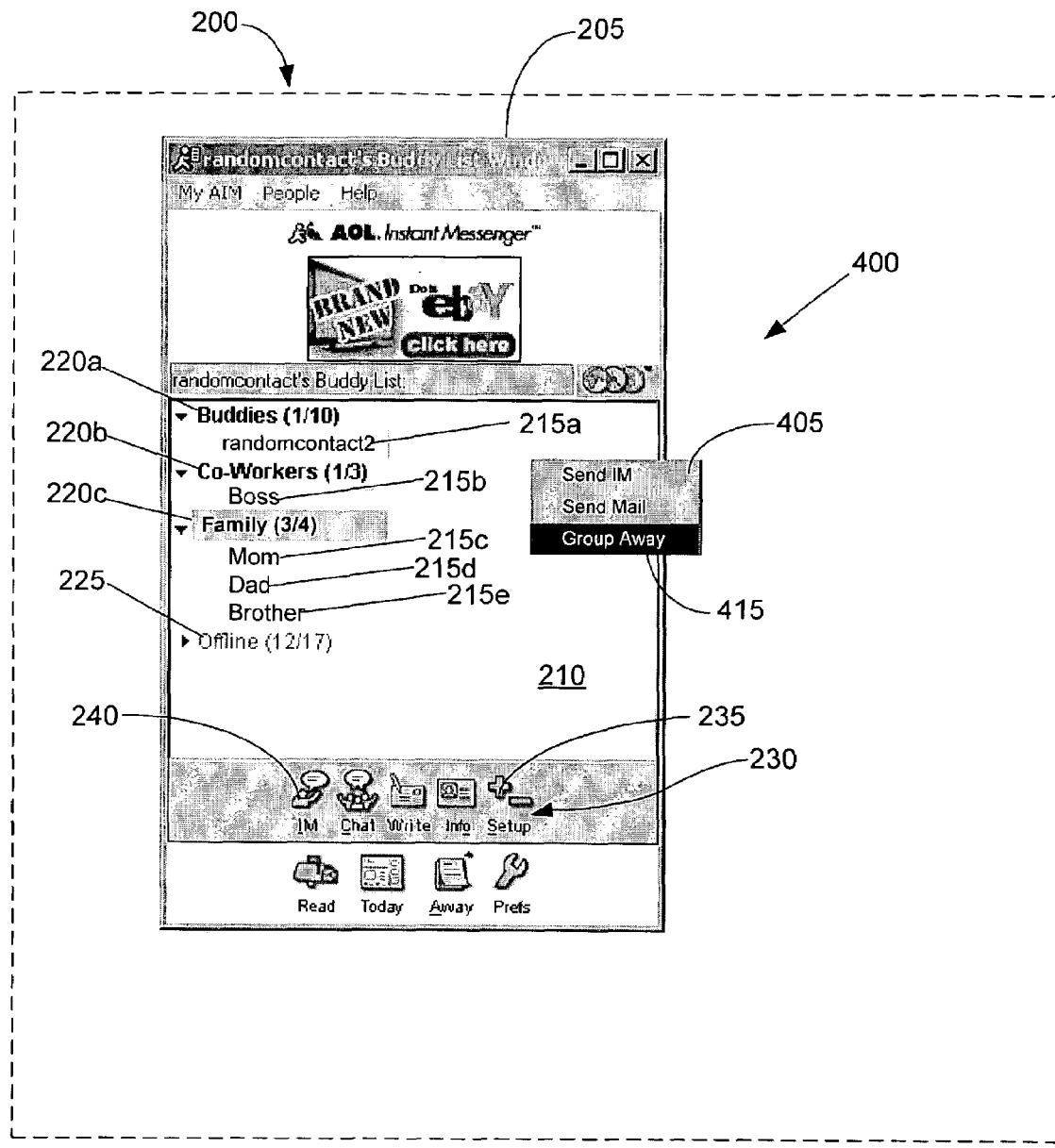
FIGS. 4A and 4B are illustrations showing an interface that permits a user to set customized messages on a per-group basis.
Figure 4B:
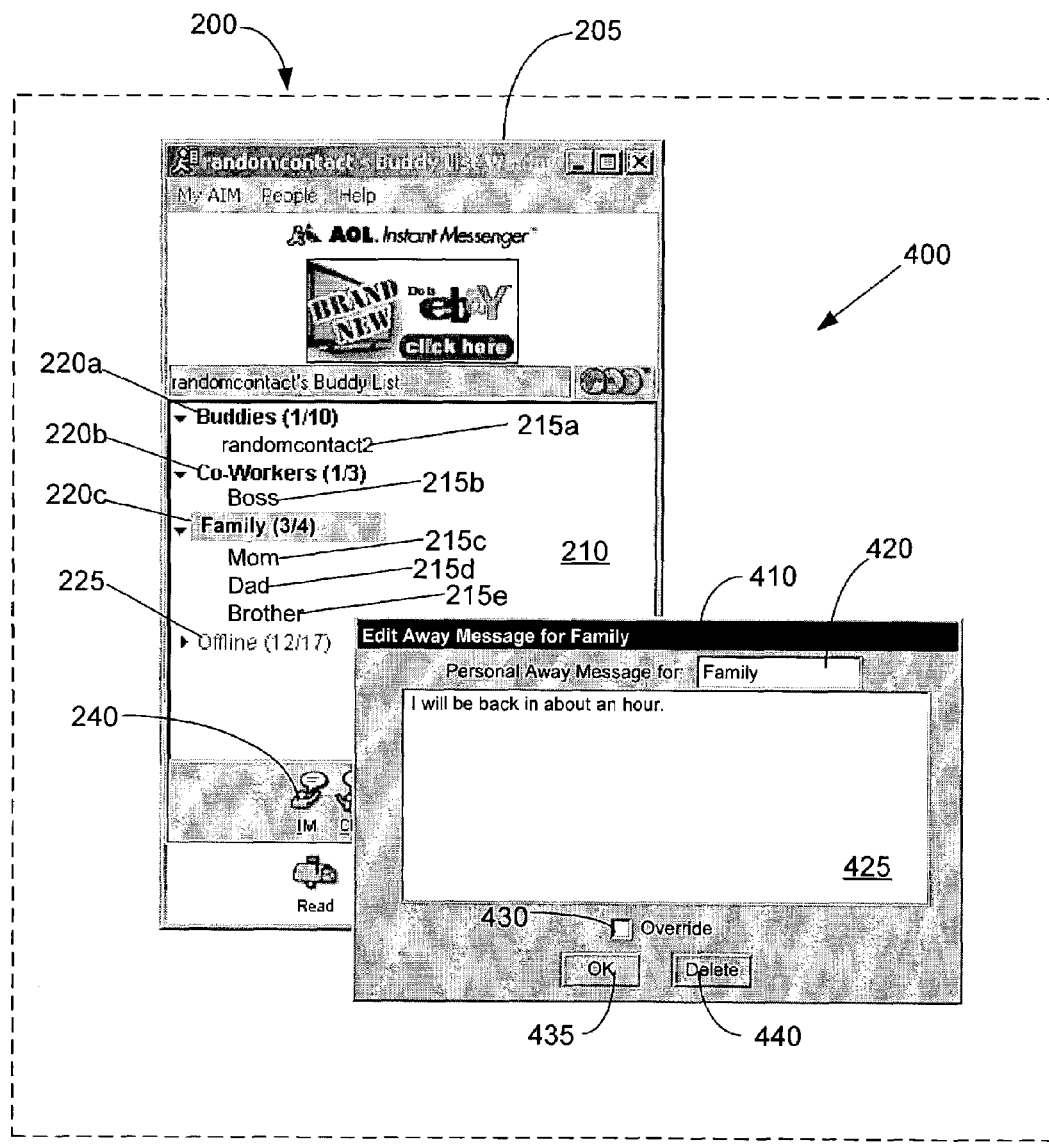

FIGS. 4A and 4B illustrate an interface 400 that permits a user to set customized messages on a per-buddy group basis. The interface 400 includes the instant messaging client program interface 205, a context menu 405 (shown in FIG. 4A), and a dialog box 410 (shown in FIG. 4B). Context menu 405 may be invoked by using a mouse to select a buddy group, for example the Family buddy group 220c, and clicking a button on the mouse. Context menu 405 provides several options for actions that can be performed. A Group Away option 415 allows the user to set a group away message for the buddy group selected.

Selecting the Group Away option 415 invokes dialog box 410. Dialog box 410 includes a text box 420 that contains the name of the buddy group for which the group away message is being set (e.g., Family), and which allows for entry/selection of other groups for which group away messages are desired. Dialog box 410 also includes an edit box 425 into which the user may enter text for the group away message. A checkbox 430 may be used to indicate whether the text entered into the edit box 425 for the group away message is being appended to a global away message or if the text is replacing the global away message. When checkbox 430 is checked, the text entered into the edit box 425 replaces the global away message, while the text is appended to the global away message when the checkbox 430 is not checked.

An OK button 435 is used to set the group away message using the text entered into edit box 425. Thus, when checkbox 430 is checked and the OK button 435 is selected, the group away message is set to just the text entered into the edit box 425. When the checkbox 430 is unchecked and the OK button 435 is selected, the group away message is set to the global away message with the text entered into the edit box 425 appended thereto.

Selecting a Delete button 440 deletes any entered text from edit text box 420 and removes the group away message.

Figure 5A:
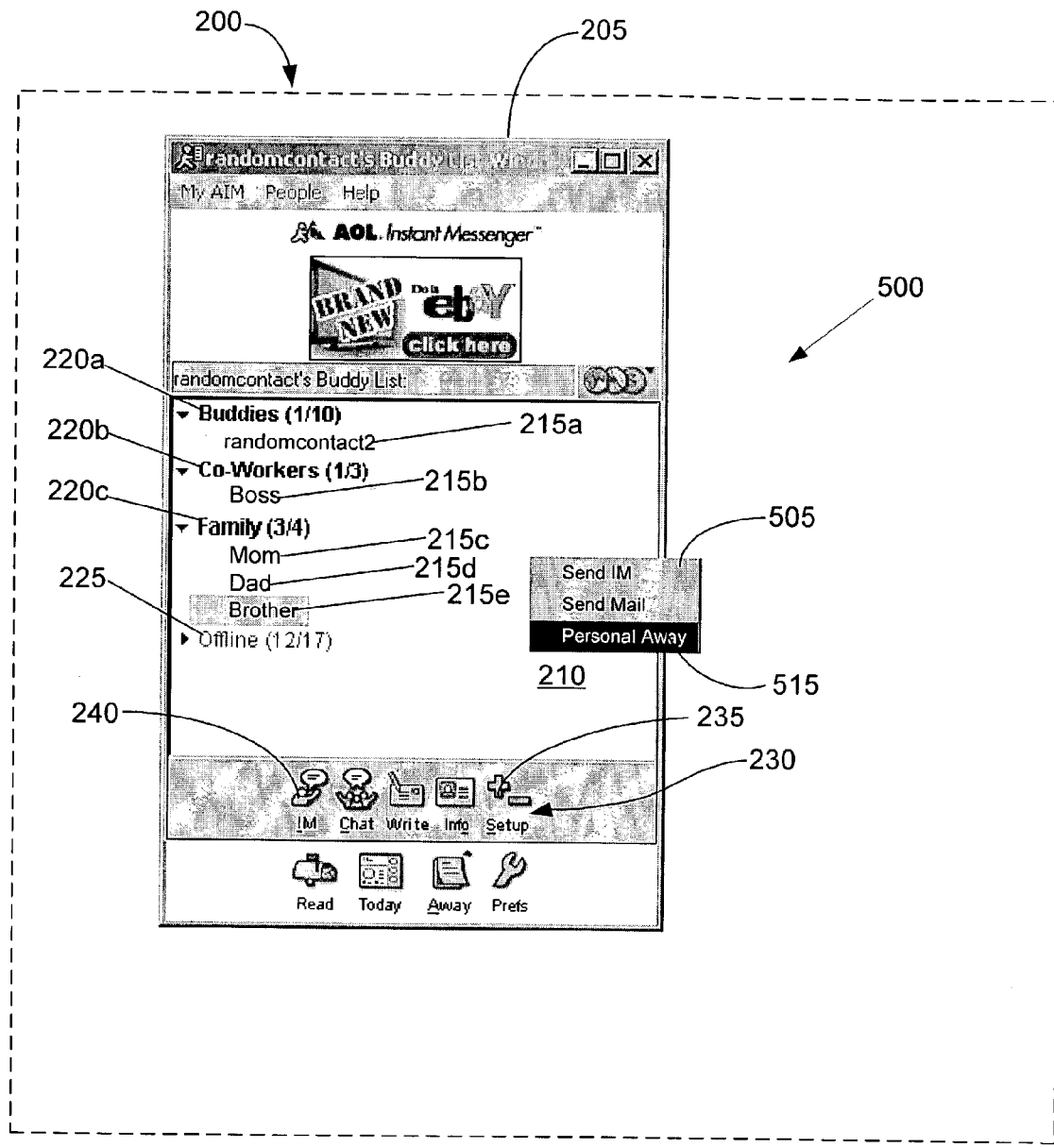
FIGS. 5A-5C are illustrations showing an interface that may be used for allowing a user to customize on a per buddy basis.
Figure 5B:
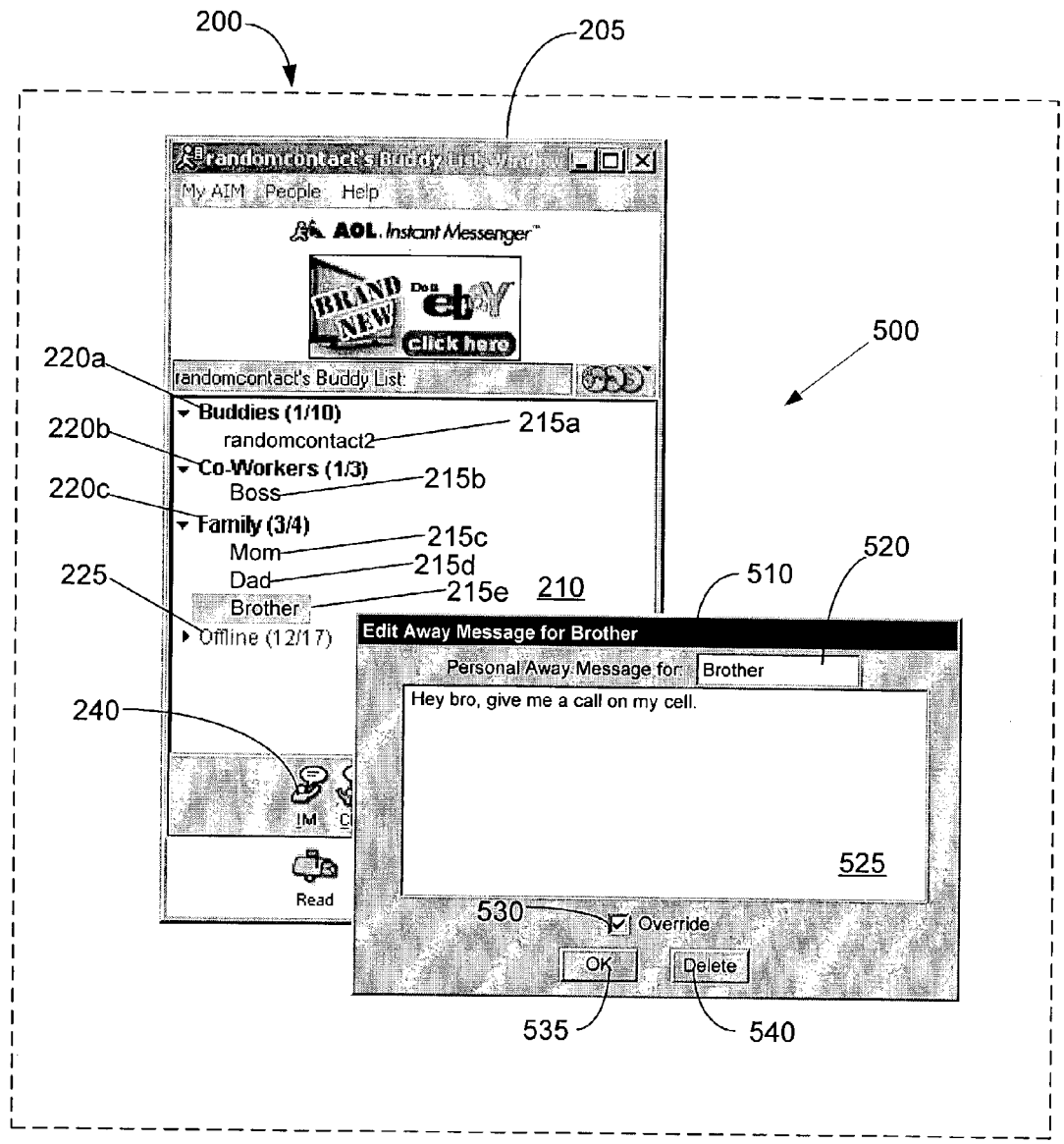

FIGS. 5A and 5B show an interface 500 that may be used for further allowing the user to customize on a per buddy basis. The interface 500 is similar to interface 400 and includes the instant messenger client program interface 205, a context menu 505 (shown in FIG. 5A), and a dialog box 510 (shown in FIG. 5B). Context menu 505 may be invoked by using a mouse to select a buddy, for example Brother 215e, and clicking a button on the mouse. Context menu 505 provides several options for actions that can be performed. A Personal Away option 515 allows the user to set a personal away message for the buddy selected.

Selecting the Personal Away option 515 invokes dialog box 510. Dialog box 510 includes a text box 520 that contains the name of the buddy for which the personal away message is being set (e.g., Brother). Dialog box 510 also includes an edit box 525 into which the user may enter text for the personal away message. A checkbox 530 may be used to indicate whether the text entered into the edit box 525 for the personal away message is being appended to the global or group away message (if one is set) or if the text is replacing the global or group away message (if one is set). When checkbox 530 is checked, the text entered into the edit box 525 replaces the global or group away message, while the text is appended to the global or group away message when the checkbox 530 is not checked.

An OK button 535 is used to set the personal away message using the text entered into edit box 525. Thus, when checkbox 530 is checked and the OK button 535 is selected, the personal away message is set to just the text entered into the edit box 525. When the checkbox 530 is unchecked and the OK button 535 is selected, the personal away message is set to the global or group away message with the text entered into the edit box 525 appended thereto.

Selecting a Delete button 540 deletes any entered text from edit box 520 and removes the personal away message.

When implementing the instant messaging program to allow customized messages on a per-buddy group and per-buddy basis, the context menus 405 and 505 may be implemented as a single context menu and the dialog boxes 410 and 510 may be implemented as a single dialog box. The single context menu may be invoked when either a buddy group or buddy is selected and may have a single option (e.g., a personalize away message option) for invoking the single dialog box. The single dialog box may then be used to set the away message for the buddy or buddy group selected, overriding or appending to the group away message (or global away message if no group away is set) when a buddy is selected or the global away message when a buddy group is selected.

The text box that contains the name of the buddy or buddy group may be an edit box such that the name can be edited by the user, with the changes applied to the buddy or buddy group entered. In such an implementation, for instance, if a user originally invokes the dialog box for the Family buddy group, the edit box contains the name "Family." After the user has entered and set the group away message for Family, the user can then delete "Family" from the edit box and enter "Brother." After entering "Brother," the user then may use the dialog box to enter and set a personal away message for Brother, without having to go back to the context menu to invoke the dialog box.

Figure 5C:
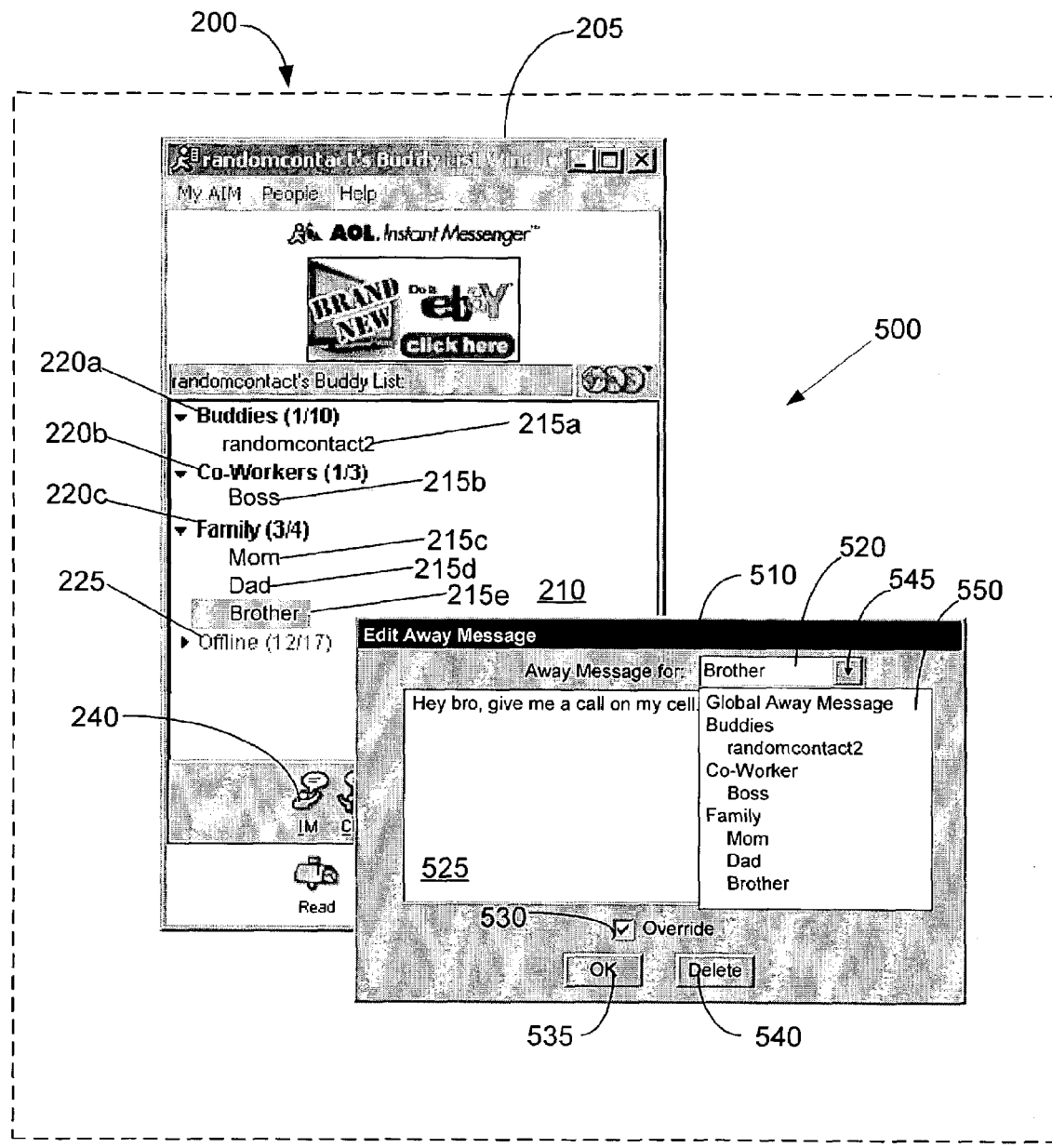

FIG. 5C illustrates another exemplary dialog box 510 in which box 520 is a combo-box instead of a text box. Dialog box 510 is used to set the global message, group messages, and personal messages. Selecting a drop-down button 545 on combo box 520 causes a pull-down list 550 to be displayed. Pull-down list 550 is populated with the buddy groups and buddies from the buddy list, in addition to an option for the global away message. To set a message, the user selects the global away message, the buddy group, or the buddy from the populated list, types the message into edit box 525, and selects OK button 535. In this way, the user can easily select the buddy group or buddy for which a message is to be set, without having to type the name of the buddy group or buddy.

Dialog boxes 410 and 510 may be designed to show the messages (i.e., group away message or global away message) that the new message is to replace or be appended. Also, the display of checkboxes 430 and 530 in dialog boxes 410 and 510 may be conditioned on the actual existence of the message(s) to be replaced or appended. For example, if a global message does not exist, checkbox 430 may not be visible.

FIGS. 6A-6D show an instant messaging window 670 displaying exemplary away messages presented to buddies attempting to communicate with the user. As with window 270, window 670 includes a titlebar 675, in which the buddy's screenname ("randomcontact") is shown. Window 670 also includes a text box 680, in which sent and received messages appear, and an edit box 685, in which messages are entered.

In the examples shown, randomcontact has configured the away messages such that the global away message for all buddies is "I am away from my computer right now." For the Co-Workers group, the group away message has been set by appending "If you need me, give me a call on my cell at (555) 555-5555." to the global away message. As a result, the group away message for the Co-Workers buddy group is "I am away from my computer right now. If you need me, give me a call on my cell at (555) 555-5555." For the Family group, the group away message has been set by appending "I will be back in about an hour." to the global away message. As a result, the group away message for the Family buddy group is "I am away from my computer right now. I will be back in about an hour." A personal away message has been set for the buddy Brother by overriding the Family group away message and replacing the Family group away message with "Hey Bro, give me a call on my cell."

Figure 6A:
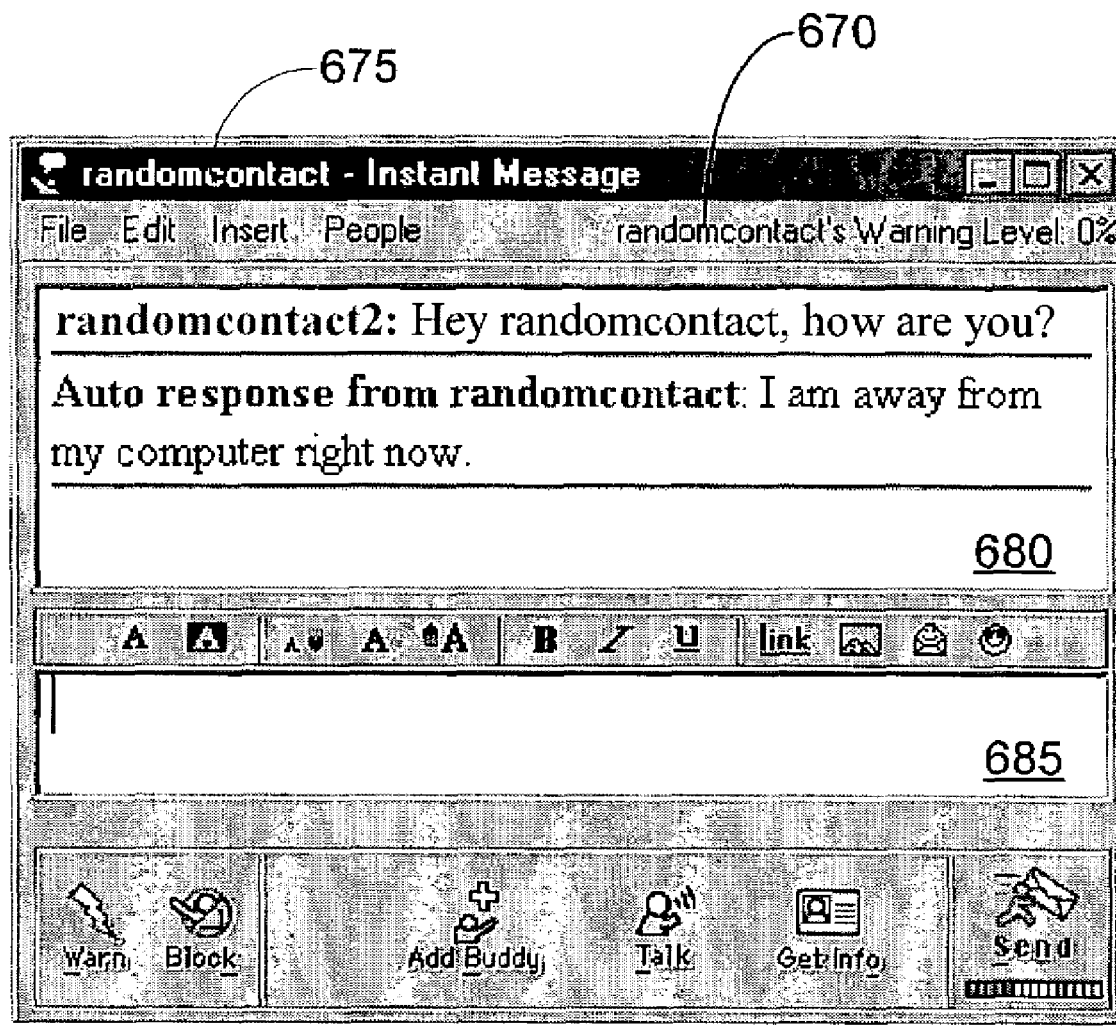
FIGS. 6A-6D are illustrations showing an instant messaging window displaying exemplary away messages that are customized.

FIG. 6A shows the response when randomcontact2 attempts to communicate with randomcontact. Randomcontact2 sent an instant message to randomcontact saying "Hey randomcontact, how are you?". Because randomcontact has not set a group away message for the Buddies buddy group and has not set a personal away message for randomcontact2, randomcontact2 receives an auto-response with the global away message, "I am away from my computer right now."

Figure 6B:
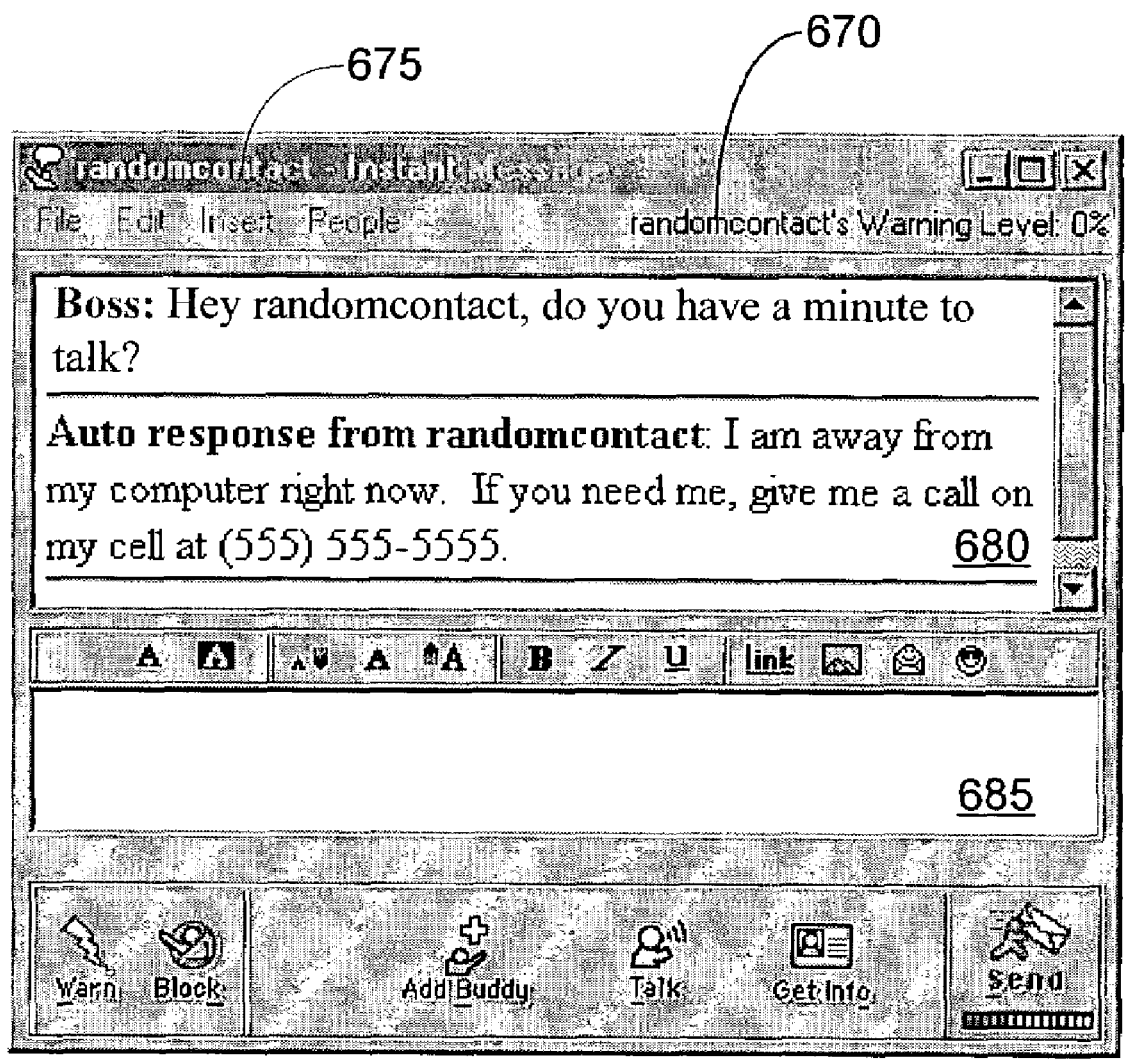

FIG. 6B shows the response when Boss attempts to communicate with randomcontact. Boss sent an instant message to randomcontact saying "Hey randomcontact, do you have a minute to talk?". Because randomcontact has set a group away message for the Co-Workers group (the group that includes Boss), but has not set a personal away message for Boss, Boss receives an auto-response with the Co-Worker group default message, "I am away from my computer right now. If you need me, give me a call on my cell at (555) 555-5555."

Figure 6C:
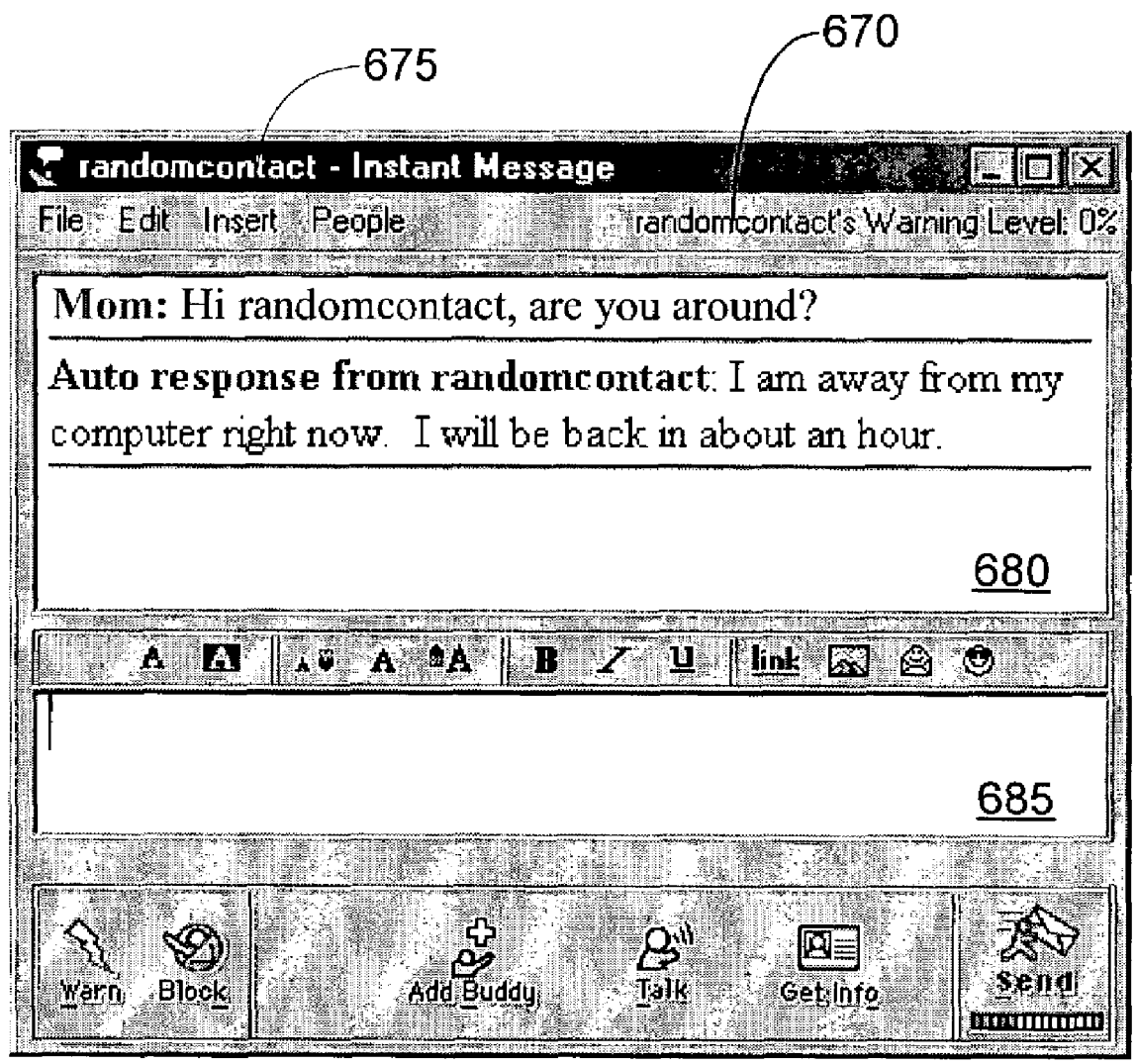

FIG. 6C shows the response when Mom attempts to communicate with randomcontact. Mom sent an instant message to randomcontact saying "Hi randomcontact, are you around?". Because randomcontact has set a group away message for the Family group (the group that includes Mom), but has not set a personal away message for Mom, Mom receives an auto-response with the Family group default message, "I am away from my computer right now. I will be back in an hour."

Figure 6D:
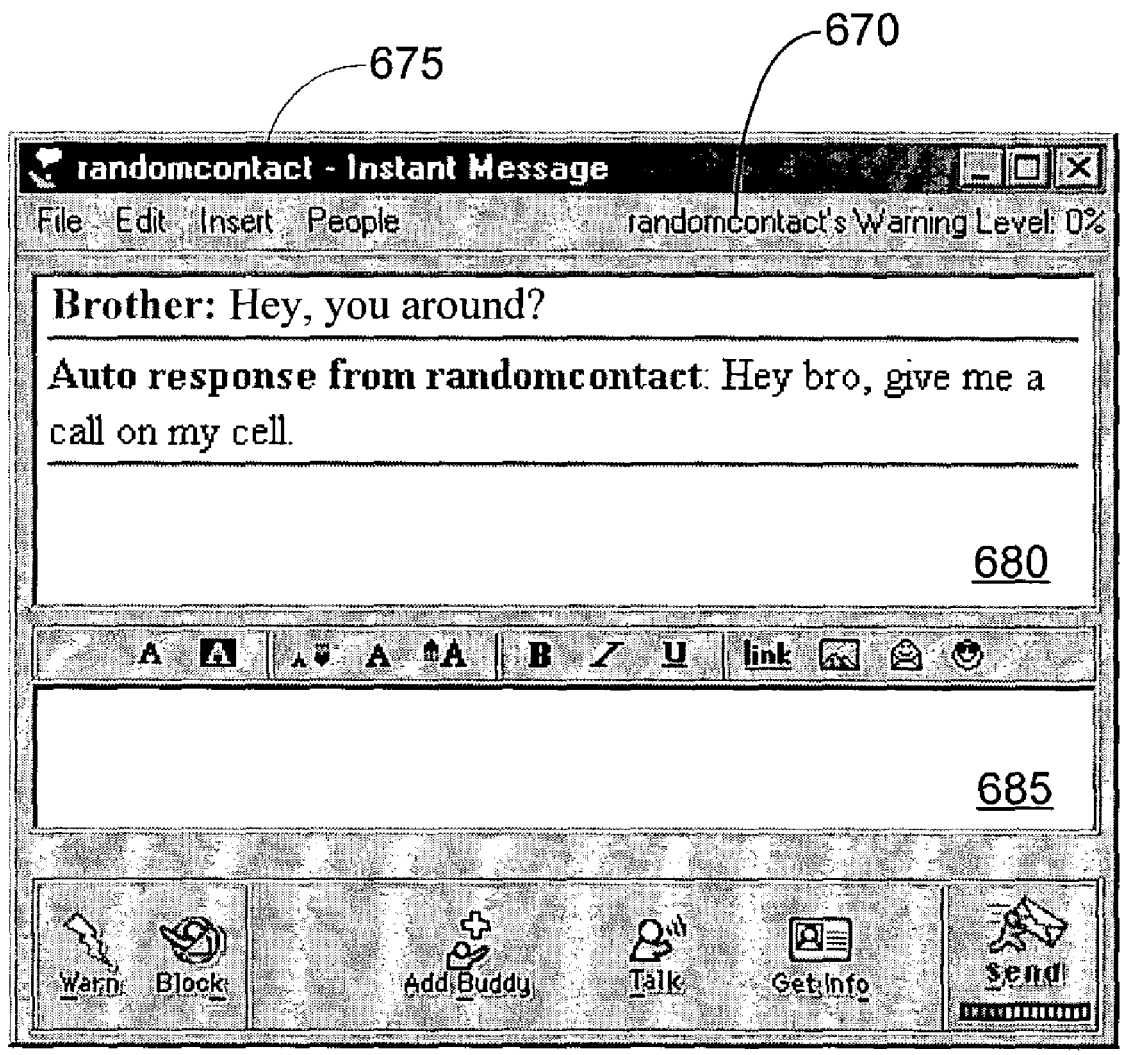

FIG. 6D shows the response when Brother attempts to communicate with randomcontact. Brother sent an instant message to randomcontact saying "Hey, you around?". As described above, randomcontact has set a personal away message for Brother by overriding the Family group message. Therefore, even though randomcontact has set a group default away message for the Family buddy group, Brother receives an auto response with the personal away message, "Hey bro, give me a call on my cell."

While the techniques have been described primarily with IM applications, they may be applied to other communications programs such as e-mail programs. For example, contacts in an e-mail program may be grouped into categories and auto-replies (i.e., automatic replies to an e-mail received from the contact) may be set on a per-category or per-contact basis.

A number of implementations have been described. Nevertheless, it will be understood that various modifications may be made. Accordingly, other implementations are within the scope of the following claims.

What is claimed is:

1. A method for providing customized away messages to buddies of an instant messaging program user who try to communicate with the user through the instant messaging program while the user is away, wherein buddies of the user are grouped into buddy groups, the method comprising:

providing an interface that displays representations of the buddies in a manner that identifies one or more buddy groups and the membership of buddies within one or more of those buddy groups;
permitting the user to select a buddy group using the interface;
permitting the user to set a group away message for the selected buddy group, wherein the set group away message is sent to buddies grouped into the selected buddy group that attempt to communicate with the user through the instant messaging program when the user is away;
permitting the user to select one of the buddies that belongs to the buddy group for which the group away message is set; and
permitting the user to set a personal away message for the selected buddy, wherein the personal away message is sent to the selected buddy when the selected buddy attempts to communicate with the user through the instant messaging program when the user is away,
wherein setting a personal away message comprises appending an additional message on to the group away message.

2. The method of claim 1 further comprising permitting the user to set a global away message, wherein the global away message is sent to buddies which belong to buddy groups for which no group away message has been set and for which no personal away message has been set.

3. A method for providing customized away messages to buddies of an instant messaging program user who try to communicate with the user through the instant messaging program while the user is away, the method comprising:
providing an interface that displays a representation of at least one buddy group and a representation of at least one buddy included in the buddy group, wherein the representation of the buddy group and the representation of the buddy are displayed in a manner that indicates the buddy is included in the buddy group;
permitting the user to set a global away message using the interface;
permitting the user to set a group away message for the buddy group using the interface;
permitting the user to set a personal away message for the buddy using the interface; and
in response to the buddy attempting to communicate with the user through the instant messaging program when the user is away:
sending the personal away message to the buddy if the user has set the personal away message;
sending the group away message to the buddy if the user has set the group away message; and
sending the global away message to the buddy if the user has set the global away message.

4. The method of claim 3 wherein setting a personal away message comprises appending an additional message on to the group away message.

5. The method of claim 3 wherein setting a personal away message comprises replacing the group away message with a new message.

6. The method of claim 3 wherein setting a group away message comprises appending an additional message on to the global away message.

7. The method of claim 3 wherein setting a group away message comprises replacing the global away message with a new message.

8. An instant messaging program, embodied on a computer-usable storage medium, that allows a user to set customized away messages to be sent to buddies of the user who try to communicate with the user through the instant messaging program while the user is away, wherein buddies of the user are grouped into buddy groups, the program comprising:
a first interface element that displays representations of the buddies in a manner that identifies one or more buddy groups and the membership of buddies within one or more of those buddy groups;
a second interface element that allows the user to enter a message; and
a third interface element that allows a customized away message to be set for a buddy by appending an additional message on to a customized away message set for the buddy group that includes the buddy,
wherein the first and second interface elements enable the user to set customized away messages on a per-buddy group basis and enable the user to set customized away messages on a per-buddy basis.

9. A computer-usable storage medium having a computer program embodied thereon for providing customized away messages to buddies of an instant messaging program user who try to communicate with the user through the instant messaging program while the user is away, wherein buddies of the user are grouped into buddy groups, the computer program comprising instructions for causing a computer to:
provide an interface that displays representations of the buddies in a manner that identifies one or more buddy groups and the membership of buddies within one or more of those buddy groups;
permit the user to select a buddy group using the interface;
permit the user to set a group away message for the selected buddy group, wherein the set group away message is sent to buddies grouped into the selected buddy group that attempt to communicate with the user through the instant messaging program when the user is away;
permit the user to select one of the buddies that belongs to the buddy group for which the group away message is set; and
permit the user to set a personal away message for the selected buddy, wherein the personal away message is sent to the selected buddy when the selected buddy attempts to communicate with the user through the instant messaging program when the user is away,
wherein, to set a personal away message, the computer program further comprises instructions for causing the computer to append an additional message on to the group away message.

10. The computer-usable storage medium of claim 9 wherein the computer program further comprises instructions for causing a computer to permit the user to set a global away message, wherein the global away message is sent to buddies which belong to buddy groups for which no group away message has been set and for which no personal away message has been set.

11. A method for providing customized away messages to buddies of an instant messaging program user who try to communicate with the user through the instant messaging program while the user is away, wherein buddies of the user are grouped into buddy groups, the method comprising:
providing an interface that displays representations of the buddies in a manner that identifies one or more buddy groups and the membership of buddies within one or more of those buddy groups;
permitting the user to select a buddy group using the interface;

permitting the user to set a group away message for the selected buddy group, wherein the set group away message is sent to buddies grouped into the selected buddy group that attempt to communicate with the user through the instant messaging program when the user is away; and permitting the user to set a global away message, wherein the global away message is sent to buddies which belong to groups for which a group away message has not been set, wherein setting a group away message comprises appending an additional message on to the global away message.

12. An instant messaging program, embodied on a computer-usable storage medium, that allows a user to set customized away messages to be sent to buddies of the user who try to communicate with the user through the instant messaging program while the user is away, wherein buddies of the user are grouped into buddy groups, the program comprising:
- a first interface element that displays representations of the buddies in a manner that identifies one or more buddy groups and the membership of buddies within one or more of those buddy groups;
- a second interface element that allows the user to enter a message; and
- a third interface element that allows a customized away message to be set for a buddy group by appending an additional message on to a global away message,
- wherein the first and second interface elements enable the user to set customized away messages on a per-buddy group basis and enable the user to set a global away message to be sent to buddies.

13. A computer-usable storage medium having a computer program embodied thereon for providing customized away messages to buddies of an instant messaging program user who try to communicate with the user through the instant messaging program while the user is away, wherein buddies of the user are grouped into buddy groups, the computer program comprising instructions for causing a computer to:
- provide an interface that displays representations of the buddies in a manner that identifies one or more buddy groups and the membership of buddies within one or more of those buddy groups;
- permit the user to select a buddy group using the interface;
- permit the user to set a group away message for the selected buddy group, wherein the set group away message is sent to buddies grouped into the selected buddy group that attempt to communicate with the user through the instant messaging program when the user is away; and
- permit the user to set a global away message, wherein the global away message is sent to buddies which belong to groups for which a group away message has not been set,
- wherein, to set a group away message, the computer program further comprises instructions for causing the computer to append an additional message on to the global away message.

* * * * *